United States Patent
Righi et al.

(10) Patent No.: US 12,353,605 B1
(45) Date of Patent: Jul. 8, 2025

(54) OUT-OF-BAND (OOB) REMOTE ATTESTATION

(71) Applicant: AMERICAN MEGATRENDS INTERNATIONAL, LLC, Duluth, GA (US)

(72) Inventors: Stefano Righi, Lawrenceville (GA); Muthukkumaran Ramalingam, Duluth, GA (US); Madhan B. Santharam, Cumming, GA (US); Paul Rhea, Lawrenceville, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 253 days.

(21) Appl. No.: 18/186,925

(22) Filed: Mar. 20, 2023

(51) Int. Cl.
*G06F 21/57* (2013.01)
*G06F 21/31* (2013.01)
*G06F 21/64* (2013.01)

(52) U.S. Cl.
CPC .............. *G06F 21/64* (2013.01); *G06F 21/31* (2013.01); *G06F 21/575* (2013.01)

(58) Field of Classification Search
CPC ........ G06F 21/64; G06F 21/31; G06F 21/575; G06F 21/50; G06F 21/57
See application file for complete search history.

(56) References Cited

U.S. PATENT DOCUMENTS

| | | | | |
|---|---|---|---|---|
| 9,262,637 | B2* | 2/2016 | Jacobs | G06F 21/57 |
| 2019/0220599 | A1* | 7/2019 | Ndu | G06F 21/53 |
| 2019/0268318 | A1* | 8/2019 | Tsirkin | G06F 21/44 |
| 2019/0332391 | A1* | 10/2019 | Ndu | G06F 21/575 |
| 2020/0322423 | A1* | 10/2020 | Sheth | H04L 61/4511 |
| 2021/0141665 | A1* | 5/2021 | Poornachandran | G06F 9/4856 |
| 2023/0052608 | A1* | 2/2023 | Wattiau | H04L 9/3271 |
| 2023/0342449 | A1* | 10/2023 | Walsh | G06F 21/44 |
| 2023/0342472 | A1* | 10/2023 | Shao | G06F 21/575 |
| 2023/0421389 | A1* | 12/2023 | Hillier | H04L 9/3263 |
| 2024/0137363 | A1* | 4/2024 | Edwards | H04L 43/50 |
| 2024/0303339 | A1* | 9/2024 | Paulraj | H04L 9/0643 |

* cited by examiner

*Primary Examiner* — Malcolm Cribbs
(74) *Attorney, Agent, or Firm* — Newport IP, LLC; Leonard J. Hope

(57) ABSTRACT

A computing system includes a baseboard management controller ("BMC") that receives a security token from a management system. The computing system also executes a firmware that collects measurements from components of the computing system. The measurements include data describing the components for use in attestation. The firmware provides the measurements to the BMC, which generates a digital signature of the measurements and the security token. The BMC provides the measurements and the digital signature to the management system, which attempts to verify the digital signature utilizing a public key associated with the BMC. If the management system can verify the digital signature, then the BMC utilized the correct security key to generate the digital signature and the measurements were not tampered with after collection by the firmware. The measurements can then be utilized to attest the computing system.

20 Claims, 7 Drawing Sheets

PROVISIONING BMC FOR OUT-OF-BAND REMOTE ATTESTATION

OUT-OF-BAND (OOB) REMOTE ATTESTATION

BACKGROUND

Attestation is a process for validating the trustworthiness of components within a computing system, such as hardware, software, and firmware, to ensure that the components are not tampered with. Some previous mechanisms for attestation utilize a software component, sometimes referred to as a "platform security agent," that executes on an operating system of the computing system to be attested. The platform security agent collects and exposes data that can be utilized to attest the trustworthiness of the computing system upon which it is executing. The process of utilizing a software component to collect data for use in attestation that executes after a computing system has booted an operating system is commonly referred to as "in-band" attestation.

In-band attestation mechanisms suffer from several significant technical problems. For example, in order to implement in-band attestation, a different platform security agent has to be developed and maintained for each supported operating system. Moreover, the platform security agent must be deployed and executed on every computing system to be attested. Additionally, in-band attestation cannot occur unless a computing system has booted an operating system and begun executing the platform security agent.

Booting an operating system and executing a platform security agent prior to performing attestation can increase the number of opportunities for tampering and thereby reduce the security of computing systems that implement in-band attestation. Finally, systems that utilize in-band attestation generate network traffic for use in attestation on an in-band network, thereby consuming valuable bandwidth on a network that is utilized for production network traffic.

It is with respect to these and other considerations that the disclosure made herein is presented.

SUMMARY

Technologies are described herein for out-of-band ("OOB") remote attestation. Through implementations of the disclosed technologies, attestation of the components of a computing system can be performed without the utilization of a platform security agent executing on an operating system. Because no platform security agent is utilized, there is no need to develop a version of the platform security agent for each unique operating system or to deploy and execute a platform security agent on each computing system that is to be attested.

Moreover, utilizing the disclosed OOB remote attestation technologies, attestation can be performed on computing systems even before an operating system has been booted. In fact, attestation can be performed on computing systems that do not have an operating system installed, such as those newly received from a factory or distributor. In this manner, components in a computing system can be attested the very first time the computing system is powered on and prior to the installation and execution of an operating system. This can limit the tampering opportunities prior to the first attestation of the components in the computing system.

Additionally, utilizing the disclosed OOB remote attestation mechanisms, network communication utilized by the attestation process is transmitted on an OOB network, thereby isolating network traffic relating to attestation from in-band production network traffic. Technical benefits other than those specifically mentioned herein can also be realized through an implementation of the disclosed technologies.

In order to achieve the technical benefits described above, and potentially others, a managed computing system is configured with a baseboard management controller ("BMC"). A BMC is a specialized service processor that monitors the physical state of a managed computing system and communicates with a management system through an OOB network connection.

In an embodiment, the BMC is configured to receive a security token from a remote attestation service executing in a management system, in an embodiment. The BMC stores the security token for use in the manner described herein. The management system can periodically provide an updated security token to the BMC for storage and use in the manner described below. For example, the management system provides an updated security token to the BMC each time an attestation is to be performed, in an embodiment.

The managed computing system also executes a firmware, such as a Unified Extensible Firmware Interface ("UEFI") Specification-compliant firmware, in one embodiment. The firmware collects measurements from components of the computing system that include data describing the components for use in attestation. As mentioned above, attestation is a process for validating the trustworthiness of components within a computing system, such as hardware, software, and firmware, to ensure that the components are not tampered with.

In an embodiment, a boot process executing in the firmware collects the measurements at boot time of the computing system. The boot process then stores the measurements in a trusted platform module ("TPM") of the computing system, in an embodiment. In an embodiment, a data collector also executes within the firmware that retrieves the measurements from the TPM and provides the measurements to the BMC. In an embodiment, the data collector obtains the measurements from the TPM and provides the measurements to the BMC using a Security Protocol and Data Model ("SPDM")-compliant interface.

In order to securely provide the measurements to the management system, the BMC generates a digital signature of the measurements and the security token. The BMC then provides the measurements and the digital signature to the management system. In an embodiment, the BMC provides the measurements and the digital signature to the remote attestation service by way of a REDFISH-compatible interface. REDFISH is an open industry standard specification and schema for simple, modern, and secure management of scalable platform hardware, such as server computers located in data centers.

In an embodiment, a remote attestation service executing in the management system receives the measurements and the digital signature from the BMC. The remote attestation service then verifies the digital signature received from the BMC utilizing a public key associated with the private key utilized by the BMC to sign the measurements and the security token. If digital signature can be verified, this indicates that the BMC utilized the correct security token to generate the digital signature that was provided to the management system and that the measurements were not tampered with.

Accordingly, if the digital signature provided by the BMC can be verified, the remote attestation service can safely utilize the measurements received from the BMC for attestation. For example, in an embodiment, the remote attestation service compares the measurements received from the BMC to stored known-good measurements (which might be referred to herein as "golden measurements") for a component of the computing system to attest the component. If the received measurements match the known-good measurements, then the component has not been tampered with. In an embodiment, the remote attestation service generates an attestation report that indicates the trust status (e.g., trusted or untrusted) of the component and exposes the attestation report to other components operating within the management system.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
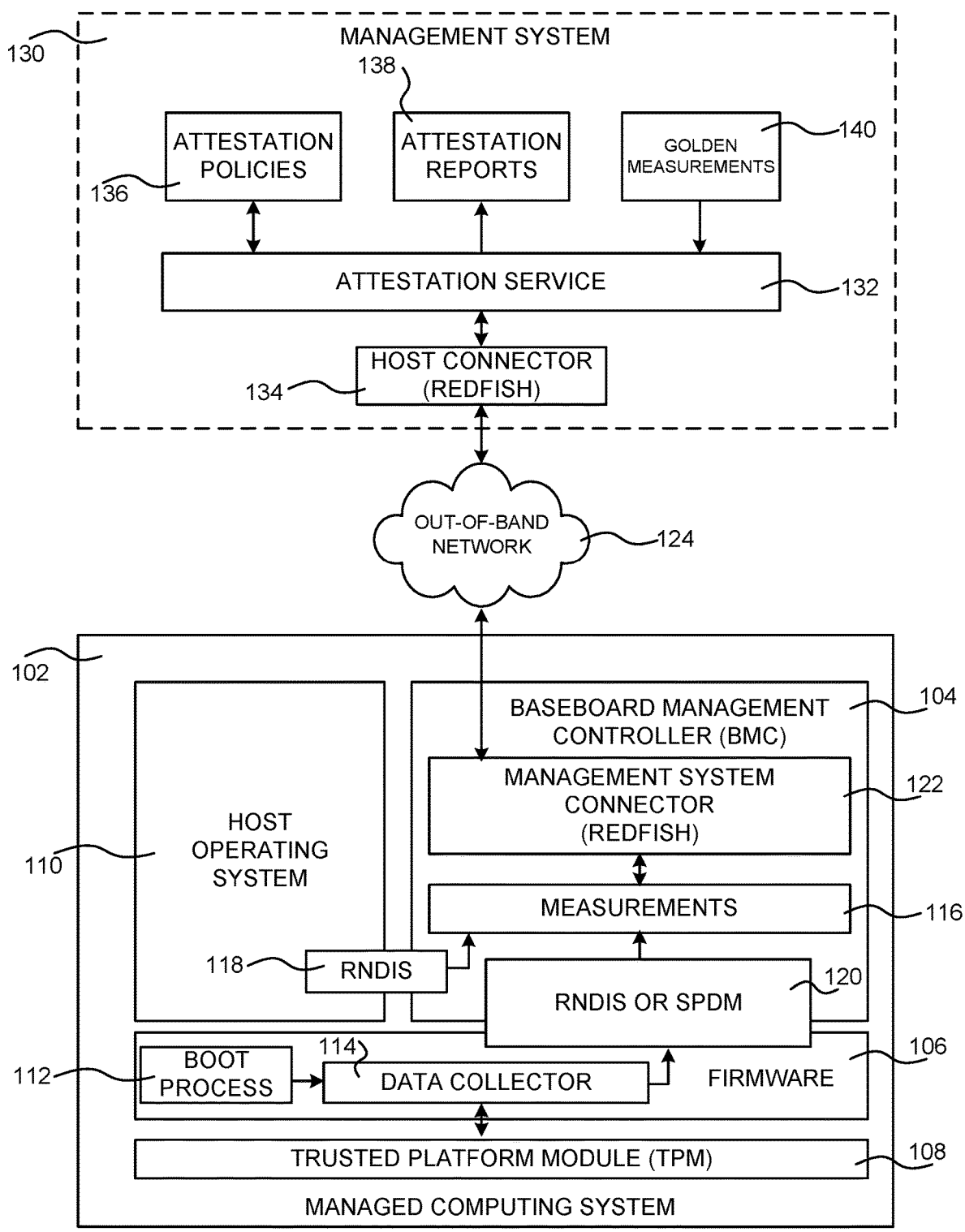
FIG. 1 is a system architecture diagram illustrating aspects of the configuration and operation of a management system and a managed computing system configured for performing OOB remote attestation, according to one or more embodiments presented herein.

The following detailed description is directed to technologies for OOB remote attestation. As discussed briefly above, attestation is a process for validating the trustworthiness of components within a computing system, such as hardware, software, and firmware, to ensure that the components are not tampered with.

As also discussed briefly above, some previous mechanisms for attestation utilize a software component, sometimes referred to as a "platform security agent," that executes on an operating system of the computing system to be attested. The platform security agent collects and exposes data that can be utilized to attest the trustworthiness of components within the computing system upon which it is executing. Utilizing a software component that executes on an operating system of the computing system to collect data for use in attestation of components within the computing system is commonly referred to as "in-band" attestation.

As also mentioned above, in-band attestation mechanisms suffer from several significant technical problems. For example, in order to implement in-band attestation, a different platform security agent has to be developed and maintained for each supported operating system. Moreover, the platform security agent must be deployed and executed on every computing system to be attested. Additionally, attestation cannot occur unless a computing system has booted an operating system and is executing the platform security agent.

Booting an operating system and executing a platform security agent prior to performing attestation can increase the number of opportunities for tampering and thereby reduce the security of computing systems that implement in-band attestation. Moreover, systems that utilize in-band attestation generate network traffic for use in attestation on an in-band network, thereby consuming valuable bandwidth on a network that is utilized for production network traffic.

The disclosed technologies address the technical considerations set forth above, and potentially others. In particular, through implementations of the disclosed technologies, attestation of the components of a computing system can be performed without the utilization of a platform security agent executing on an operating system. Because no platform security agent is utilized, there is no need to develop a version of the platform security agent for each unique operating system or to deploy and execute a platform security agent on each computing system that is to be attested.

Moreover, utilizing the disclosed OOB remote attestation technologies, attestation can be performed on computing systems even before an operating system has been booted. In fact, attestation can be performed on computing systems that do not have an operating system installed, such as those newly received from a factory or distributor. In this manner, components in a computing system can be attested the very first time the computing system is powered on and prior to the installation and execution of an operating system, thereby limiting the tampering opportunities prior to the first attestation of the components in the computing system.

Additionally, utilizing the disclosed OOB remote attestation mechanisms, network communication utilized by the attestation process is transmitted on an OOB network, thereby isolating network traffic relating to attestation from in-band production network traffic. Technical benefits other than those specifically mentioned herein can also be realized through an implementation of the disclosed technologies. Additional details regarding these aspects will be provided below with regard to FIGS. 1-5.

Before discussing the disclosed technologies in detail, it is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram illustrating aspects of the configuration and operation of a management system 130 and a managed computing system 102 (which might be referred to herein as the "computing system 102") configured for OOB remote attestation, according to one or more embodiments presented herein. As shown in FIG. 1 and described in greater detail below, the management system 130 provides functionality for managing various aspects of the operation of the computing system 102. For example, and without limitation, the management system 130 can include various components configured for monitoring the performance, security, and other aspects of the operation of the managed computing system 102. At least some of these components will be described in greater detail below.

In one embodiment, the managed computing system 102 is a server computer operating in a data center. The managed computing system 102, however, can comprise another type of computing device operating in another type of environment in other embodiments.

Managed computing systems, such as the managed computing system 102 illustrated in FIG. 1, commonly include a BMC 104. As discussed briefly above, the BMC 104 is a specialized service processor that monitors the physical state of a computer, network server, or other hardware device using sensors and communicates with a management system 130 through an OOB network 124.

The OOB network 124 is a communications network that is utilized for management purposes and is separate from an in-band network (not shown in FIG. 1) utilized by the computing system 102 for transmitting and receiving production network traffic. Through the use of the OOB network 124 and a BMC 104, aspects of the operation of a managed computing system 102 can be monitored and controlled even when the managed computing system 102 is not reachable via the in-band network or is powered off.

In order to enable communication between the management system 130 and the managed computing system 102, the management system 134 implements a host connector 134 and the managed computing system implements a management system connector 122, in an embodiment. In some embodiments, the host connector 134 and the management system connector 122 are configured as REDFISH-compatible interfaces. As known to those skilled in the art, REDFISH is a successor to previous manageability interfaces created by the Desktop Management Taskforce ("DMTF").

REDFISH is an open industry standard specification and schema for simple, modern, and secure management of scalable platform hardware, such as server computers located in data centers. The REDFISH specification and schema specifies a Representational State Transfer ("REST") interface and utilizes JavaScript Object Notation ("JSON") and the Open Data Protocol ("OData") to integrate management solutions within existing toolchains. Communication between the management system 130 and the managed computing system 102 can utilize other types of interfaces and data formatted according to other standards, in other embodiments.

In the embodiment shown in FIG. 1, the managed computing system 102 also includes a firmware 106. The firmware 106 provides functionality for booting the managed computing system 102. The firmware 106 also includes functionality for providing an interface to the platform hardware to an operating system 106 or application programs executing on the operating system 106. The firmware 106 might also provide other types of functionality. Examples of the firmware 106 include, but are not limited to, a PC-compatible basic input/output system ("BIOS") and a firmware compatible with the UEFI Specification. Other types of firmware 106 might also be utilized in other embodiments. Details regarding the configuration and operation of a UEFI Specification-compliant firmware 106 are provided below with regard to FIG. 4.

The managed computing system 102 also include a trusted platform module ("TPM") 108 or another type of hardware trust evaluation module in some embodiments. Generally, the TPM 108 offers facilities for the secure generation of cryptographic keys, and limitation of their use, in addition to a hardware true random number generator. The TPM 110 can also include other capabilities such as those described herein for assisting with aspects of OOB remote attestation, binding, and sealed storage. It should be appreciated that while a TPM 110 is utilized in embodiments as a hardware trust evaluation device, other types of hardware trust evaluation devices can be utilized in other configurations. Additional details regarding the operation of the TPM 110 in the embodiments disclosed herein will be provided below.

As shown in FIG. 1, the managed computing system 102 also executes a host operating system 110, in one embodiment. In this regard, however, it is to be appreciated that it is not necessary for an operating system 110 to be executing or even installed on the computing system 102 for the OOB remote attestation process disclosed herein to take place. Various computing systems operating in the management system 130 also execute appropriate operating systems, such as variants of the WINDOWS operating system from MICROSOFT CORPORATION or the LINUX operating system.

In an embodiment, the firmware 106 includes a boot process 112 that executes at the boot time of the computing system 102. As will be described in greater detail below, the boot process 112 collects the measurements 116 at boot time of the computing system 102. The measurements 116 can be obtained from various components within the managed computing system 102 such as, for instance, from the firmware 106, a bootloader, an OS kernel, hardware devices, drivers, and other components. The measurements 116 can be expressed as cryptographic hashes of values obtained from the various components, or in another manner. In one embodiment, for instance, the measurements 116 are cryptographically hashed checksums of the firmware 106.

The boot process 12 stores the measurements 116 in a TPM 108, in an embodiment. In an embodiment, a data collector 114 also executes within the firmware 106 that retrieves the measurements 116 from the TPM 108 and provides the measurements 116 to the BMC 104. In an embodiment, the data collector obtains the measurements from the TPM and provides the measurements to the BMC using a Security Protocol and Data Model ("SPDM")-compliant interface 120. In another embodiment, the interface 120 is a Remote Network Driver Interface Specification ("RNDIS")-compatible interface. In a similar fashion, the host operation system 110 is executed and provides measurements 116 to the BMC 104 via an RNDIS-compatible interface 118. The BMC 104 then stores the measurements 116 in an appropriate data store (not shown in FIG. 1).

As will be described in greater detail below with regard to FIGS. 2A and 2B, the BMC 104 generates a digital signature (not shown in FIG. 1) of the measurements 116 and a security token (also not shown in FIG. 1) provided by an attestation service 132 executing in the management system 130. The BMC 104 then provides the measurements 116 and the digital signature to the attestation service 132. In an embodiment, the BMC 104 provides the measurements 116 and the digital signature to the remote attestation service 132 by way of the management system connector 122 and the host connector 134. As discussed above, the management system connector 122 and the host connector 134 are REDFISH-compatible interfaces, in an embodiment. Other types of interfaces can be used in other embodiments.

As will be described in greater detail below with regard to FIG. 2C, the remote attestation service 132 executing in the management system 130 receives the measurements 116 and the digital signature 206A from the BMC 104. The remote attestation service 132 then verifies the digital signature 206A using the public key associated with the BMC 104. If the remote attestation service 132 can verify the digital signature 206A, this indicates that the BMC 104 utilized the correct security token to generate the digital signature 206A that was provided to the management system 130 and that the measurements 116 were not tampered with.

If the remote attestation service 132 can verify the digital signature 206A, the remote attestation service 132 can safely utilize the measurements 116 received from the BMC 104 for attestation. For example, in an embodiment, the remote attestation service 132 compares the measurements 116 received from the BMC 104 to stored golden measurements 140. If the received measurements 116 are identical to the known-good golden measurements 140, then the component associated with the measurements 116 has not been tampered with.

In an embodiment, the remote attestation service 132 generates one or more attestation reports 138 that indicate the trust status (e.g., trusted or untrusted) of the component that was attested and exposes the attestation reports 138 to other components operating within the management system 130. For example, and without limitation, the attestation service 132 can also provide network service application programming interfaces ("APIs") through which one or more orchestration systems can access the attestation reports 138 or other data indicating the trust status of components within the managed computing system 102 to determine the integrity of these components, including the firmware 106. Examples of such systems include, but are not limited to, KUBERNETES and OPENSTACK. The APIs exposed by the attestation service are implemented as JSON RESTful APIs in some embodiments. Additional details regarding the various aspects illustrated in FIG. 1 and described above will be provided below with regard to FIGS. 2A-3.

It is to be appreciated that FIG. 1 has been simplified to provide a high level overview of the technologies disclosed herein, and that many other software and hardware components can be utilized to implement the functionality disclosed herein. For example, and without limitation, other networking components can be utilized to connect the management system 130 to the managed computing system 102. In this regard, it is also to be appreciated that while only a single managed computing system 102 has been illustrated in FIG. 1, many such computing systems can be utilized and attested using the technologies disclosed herein in various configurations.

Figure 2A:
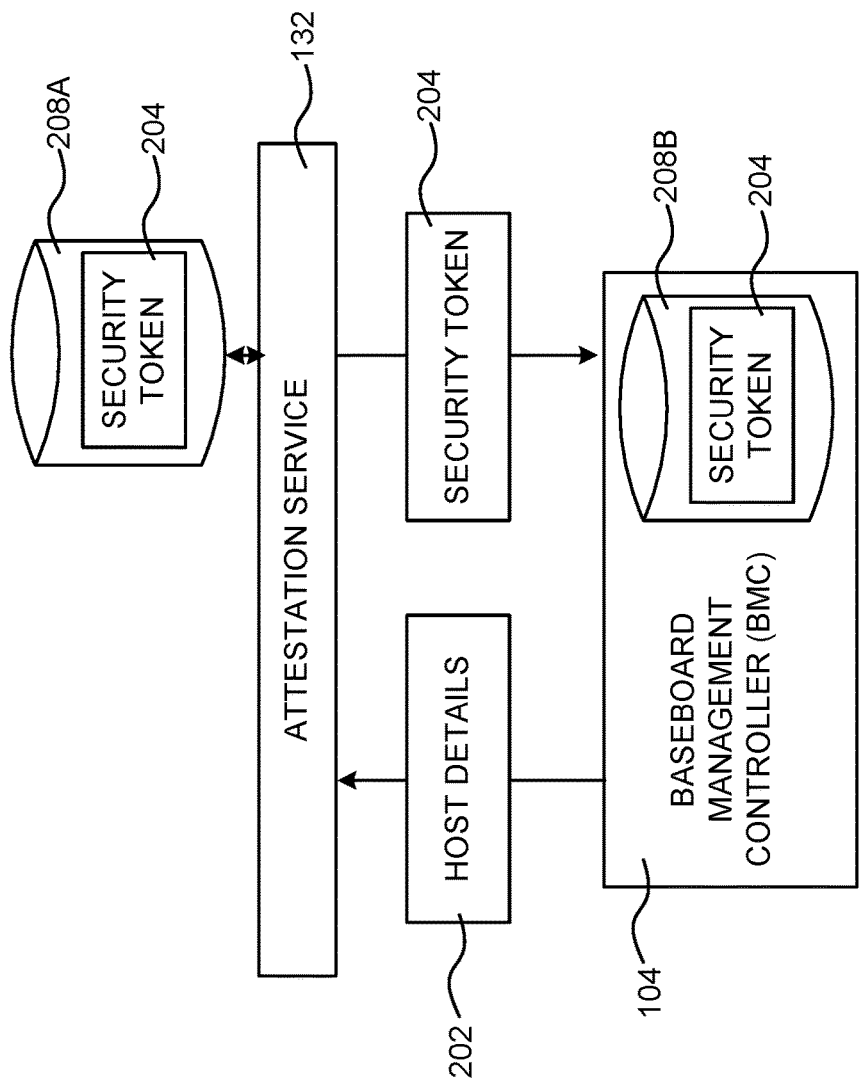
FIG. 2A is a system architecture diagram illustrating additional aspects of the configuration and operation of the management system and the managed computing system shown in FIG. 1 for performing OOB remote attestation, according to one or more embodiments presented herein.

FIG. 2A is a system architecture diagram illustrating additional aspects of the configuration and operation of the management system 130 and the managed computing system 102 shown in FIG. 1 for performing OOB remote attestation, according to one or more embodiments presented herein. As illustrated in FIG. 2A and discussed briefly above, the attestation service 132 generates a security token 204 and stores the security token 204 in an appropriate data store 208A. The security token 204 is a random or unique number or value that is unique to the BMC 104. As will be described in greater detail below, the security token 204 is utilized to ensure that measurements 116 sent from the BMC 104 to the management system 130 are not altered or tampered with.

In an embodiment, the attestation service 132 provisions the BMC 104 by transmitting a registration request to the BMC 104 using a REDFISH interface exposed by the BMC 104. In response thereto, the BMC 104 provides host details 202 that includes metadata describing aspects of the managed computing system 102 to the attestation service 132.

In an embodiment, the management system 130 transmits the security token 204 to the BMC 104, also using a REDFISH interface exposed by the BMC. The BMC 104, in turn, stores the security token 204 in an appropriate data store 208B for use in the manner described below. The management system 130 can periodically provide a new security token 204 to the BMC 104 for storage and use in the manner described herein. For example, the management system provides an updated security token to the BMC each time an attestation is to be performed, in an embodiment.

Using the mechanism shown in FIG. 2A, the BMC 104 and the management system 130 can also exchange public encryption keys ("public keys") for use in decrypting data in the manner described below. In this regard, it is to be appreciated that the mechanism shown in FIG. 2A for provisioning the BMC 104 with a security token 204 is merely illustrative and that other mechanisms can be utilized in other embodiments.

Figure 2B:
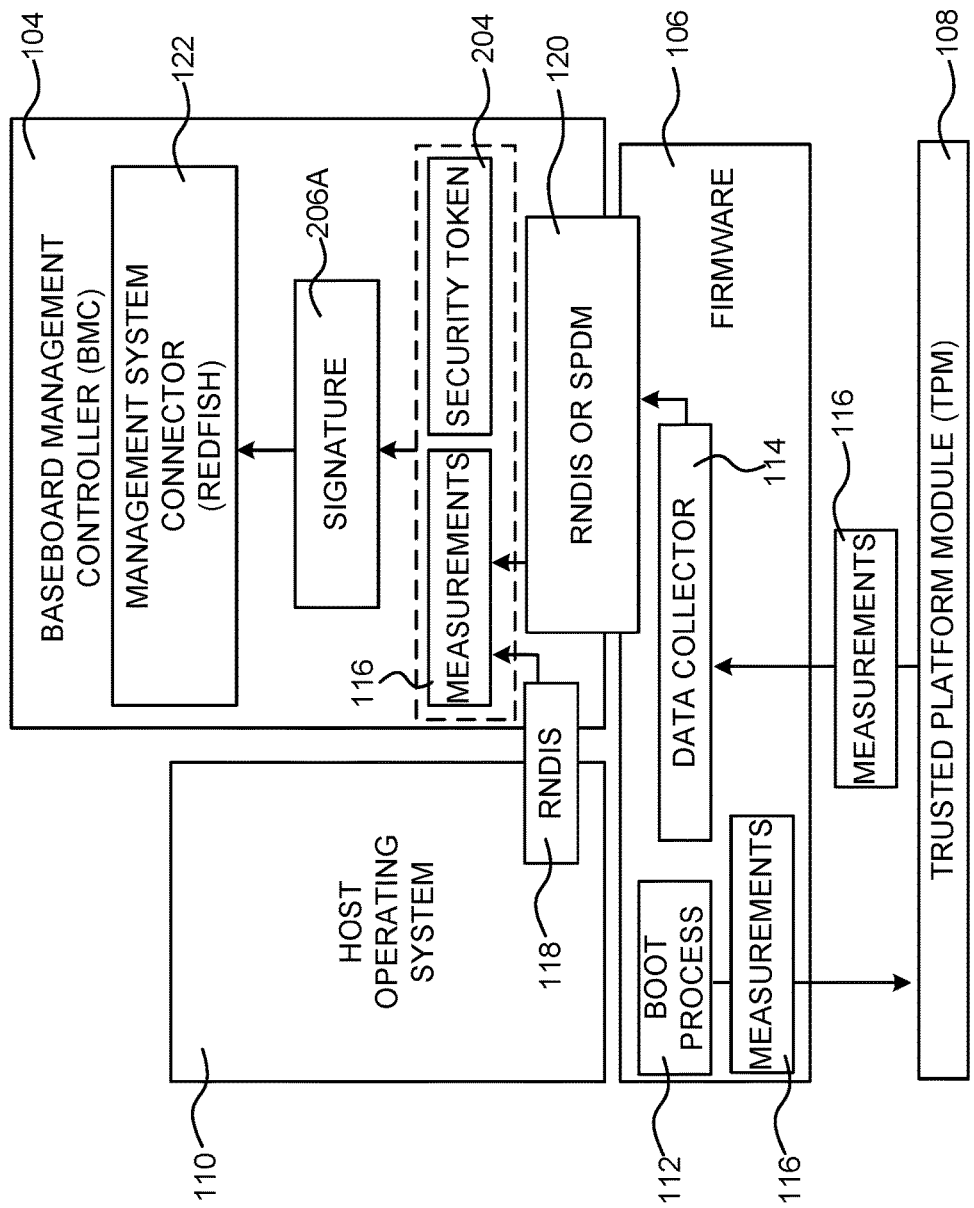
FIG. 2B is a system architecture diagram illustrating additional aspects of the configuration and operation of the managed computing system shown in FIG. 1 for performing OOB remote attestation, according to one or more embodiments presented herein.

FIG. 2B is a system architecture diagram illustrating additional aspects of the configuration and operation of the managed computing system 102 shown in FIG. 1 for performing OOB remote attestation, according to one or more embodiments presented herein. As described briefly above, the firmware 106 includes a boot process 112 that executes at the boot time of the computing system 102. In an embodiment, the boot process 112 collects the measurements 116 at boot time of the computing system 102 and stores the measurements 116 in the TPM 108. In an embodiment, the boot process 112 provides the measurements to the BMC using a SPDM-compliant interface.

The data collector 114 retrieves the measurements 116 from the TPM 108 and provides the measurements 116 to the BMC 104. In an embodiment, the data collector obtains the measurements from the TPM and provides the measurements to the BMC using a SPDM-compliant interface 120. In another embodiment, the interface 120 is a RNDIS-compatible interface. In a similar fashion, the host operation system 110 is executed and provides measurements 116 to the BMC 104 via an RNDIS-compatible interface 118, in an embodiment. The BMC 104 then stores the measurements 116 in an appropriate data store.

As shown in FIG. 2B, the BMC 104 generates a digital signature 206A of the measurements 116 and the security token 204 provided by the attestation service 132. The BMC 104 then provides the measurements 116 and the digital signature 206A to the attestation service 132. In an embodiment, the BMC 104 provides the measurements 116 and the digital signature 206A to the remote attestation service 132 by way of the management system connector 122 and the host connector 134. As discussed above, the management system connector 122 and the host connector 134 are REDFISH-compatible interfaces, in an embodiment. Other types of interfaces can be used in other embodiments.

Figure 2C:
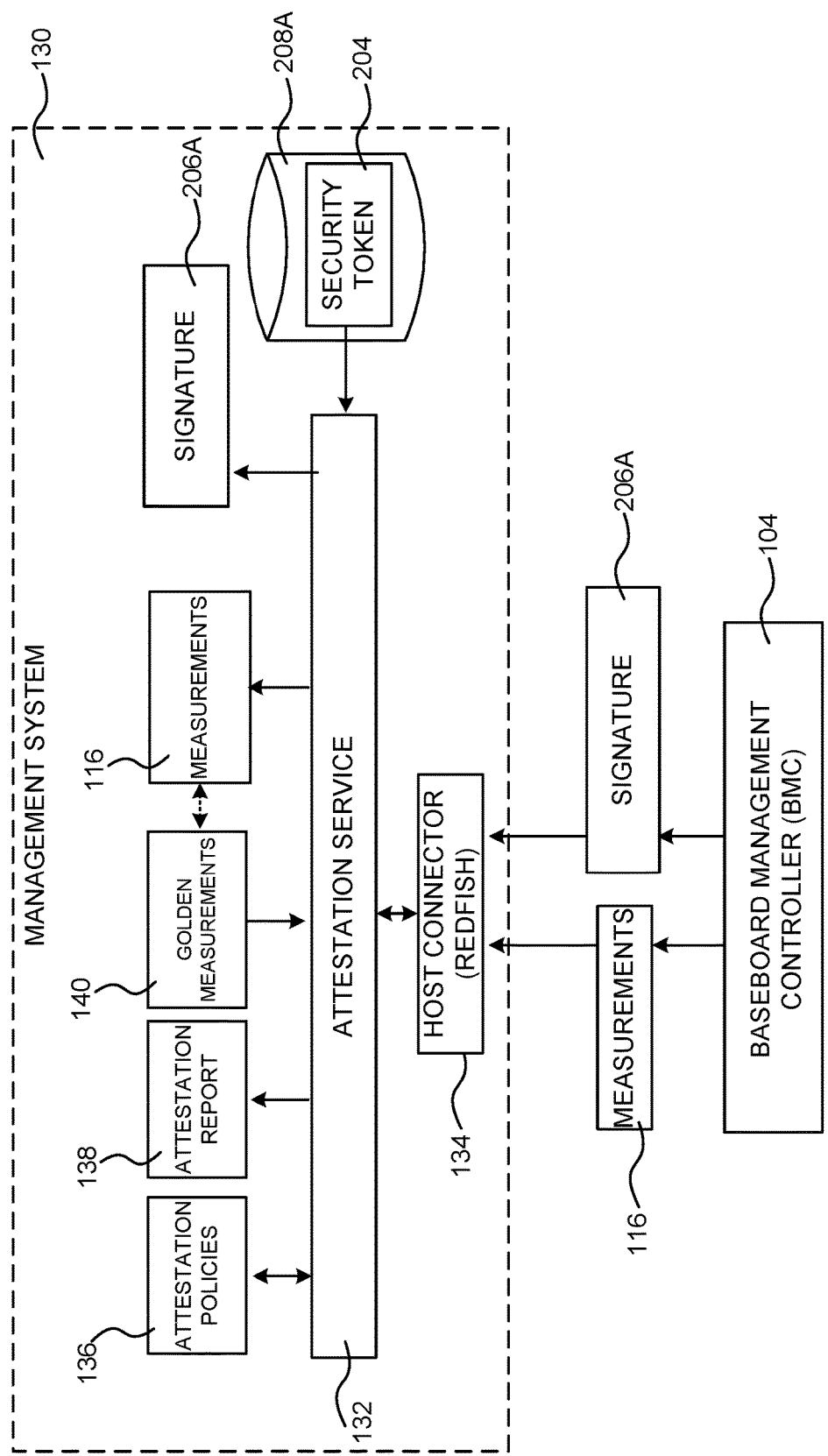
FIG. 2C is a system architecture diagram illustrating additional aspects of the configuration and operation of the management system shown in FIG. 1 for performing OOB remote attestation, according to one or more embodiments presented herein.

FIG. 2C is a system architecture diagram illustrating additional aspects of the configuration and operation of the management system 130 shown in FIG. 1 for performing OOB remote attestation, according to one or more embodiments presented herein. As shown in FIG. 2C, the remote attestation service 132 executing in the management system 130 receives the measurements 116 and the digital signature 206A from the BMC 104. The remote attestation service 132 then verifies the digital signature 206A using a public key associated with the BMC 104. If the remote attestation service 132 is able to verify the signature 206A, this indicates that the BMC 104 utilized the correct security token 204 to generate the digital signature 206A that was provided to the management system 130 and that the measurements 116 were not tampered with.

Additionally, if the remote attestation service 132 is able to verify the signature 206A, the remote attestation service 132 can safely utilize the measurements 116 received from the BMC 104 for attestation. For example, in an embodiment, the remote attestation service 132 compares the measurements 116 received from the BMC 104 to stored golden measurements 140. As discussed briefly above, the golden measurements 140 are known-good measurements. If the received measurements 116 are identical to the known-good golden measurements 140, then the component associated with the measurements 116 has not been tampered with.

In an embodiment, the remote attestation service 132 generates one or more attestation reports 138 that indicate the trust status (e.g., trusted or untrusted) of the component that was attested in the manner described above, and exposes the attestation reports 138 to other components operating within the management system 130. For example, and without limitation, the attestation service 132 can also provide network service APIs through which one or more orchestration systems can access the attestation reports 138 or other data indicating the trust status of components within the managed computing system 102 to determine the integrity of these components, including the firmware 106. Examples of such systems include, but are not limited to, KUBERNETES and OPENSTACK. The APIs exposed by the attestation service are implemented as JSON RESTful APIs in some embodiments.

In an embodiment, the managed computing system 102 can be attested based on one or more attestation policies 136. The attestation policies 136 are a set of rules that define the way that attestation is to be performed. An attestation policy 136 may have multiple rules included. Examples of such rules include, but are not limited to: attestation frequency (i.e., how often the automatic attestation is to occur); attestation on host reboot (i.e., perform an attestation immediately after the managed computing system 102 is rebooted to identify any platform security issues as soon as possible); send alert notification of attestation failure to administrators; and measurement match criteria, which can be utilized when there are multiple golden measurements 140 of the same type available for a given managed computing system 102. In this example, a rule can be defined specifying how to validate the collected measurements 116 against the golden measurements 140 (e.g., all (must match all available golden measurements 140); any (can match any available golden measurement 140); and latest—(must match only the latest golden measurement 140).

Figure 3:
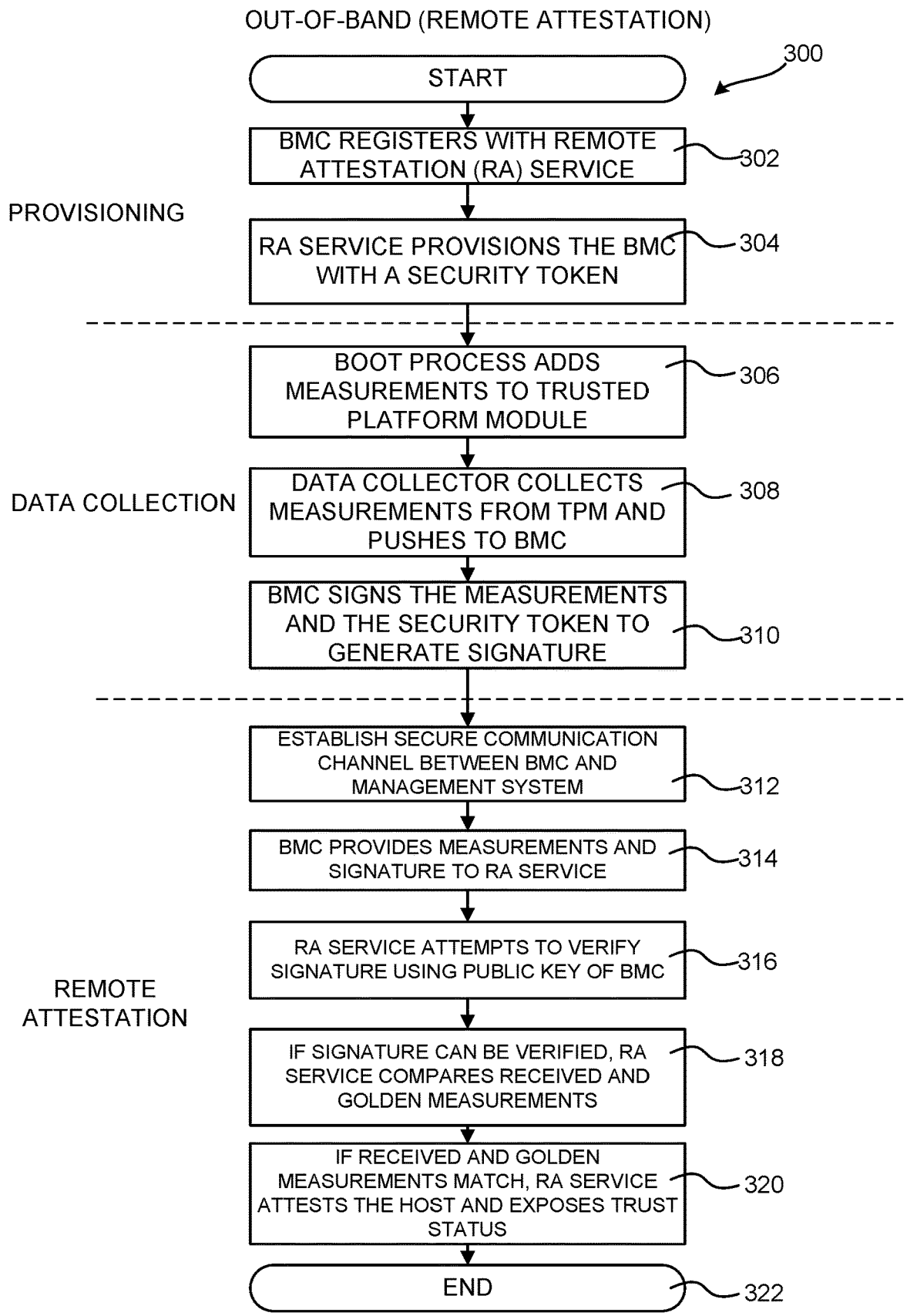
FIG. 3 is a flow diagram showing a routine that illustrates aspects of the operation of the components shown in FIGS. 1-2C for performing OOB remote attestation, according to one embodiment presented herein.

FIG. 3 is a flow diagram showing a routine 300 that illustrates aspects of the operation of the components shown in FIGS. 1-2C for OOB remote attestation, according to one embodiment presented herein. It is to be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 300 begins at operation 302, where the BMC 104 registers with the remote attestation service 132 in the manner described above with regard to FIG. 2A. As discussed above, the remote attestation service 132 provisions the BMC 104 with a security token 204 as part of the registration process. This occurs at operation 304.

From operation 304, the routine 300 proceeds to operation 306, where the boot process 112 collects the measurements 116 and adds them to the TPM 108 in the manner described above. The routine 300 then proceeds from operation 306 to operation 308, where the data collector 114 retrieves the measurements 116 from the TPM 108 and pushes the measurements to the BMC 104 using the interface 120. From operation 308, the routine 300 proceeds to operation 310, where the BMC 104 generates a digital signature 206A from the measurements 116 and the security token 204 in the manner described above with regard to FIG. 2B.

From operation 310, the routine 300 proceeds to operation 312, where a secure communication channel between the BMC 104 and the management system 130 by way of the OOB network 124. The routine 300 then proceeds from operation 314, where the BMC 104 provides the measurements 116 and the digital signature 206A to the remote attestation service 132 by way of the secure communication channel established at operation 312.

From operation 314, the routine 300 proceeds to operation 316, where the remote attestation service attempts to verify the digital signature 206A received from the BMC 104 using the public key associated with the BMC 104. If the remote attestation service can verify the digital signature 206A, the remote attestation service 132 can safely utilize the measurements 116 received from the BMC 104 for attestation. For example, in an embodiment, the remote attestation service 132 compares the measurements 116 received from the BMC 104 to stored golden measurements 140. This occurs at operation 318.

The routine 300 then proceeds from operation 318 to operation 320, where the remote attestation service 132 generates one or more attestation reports 138 that indicate the trust status (e.g., trusted or untrusted) of the component that was attested in the manner described above, and exposes the attestation reports 138 to other components operating within the management system 130. The routine 300 then proceeds from operation 320 to operation 322, where it ends.

Figure 4:
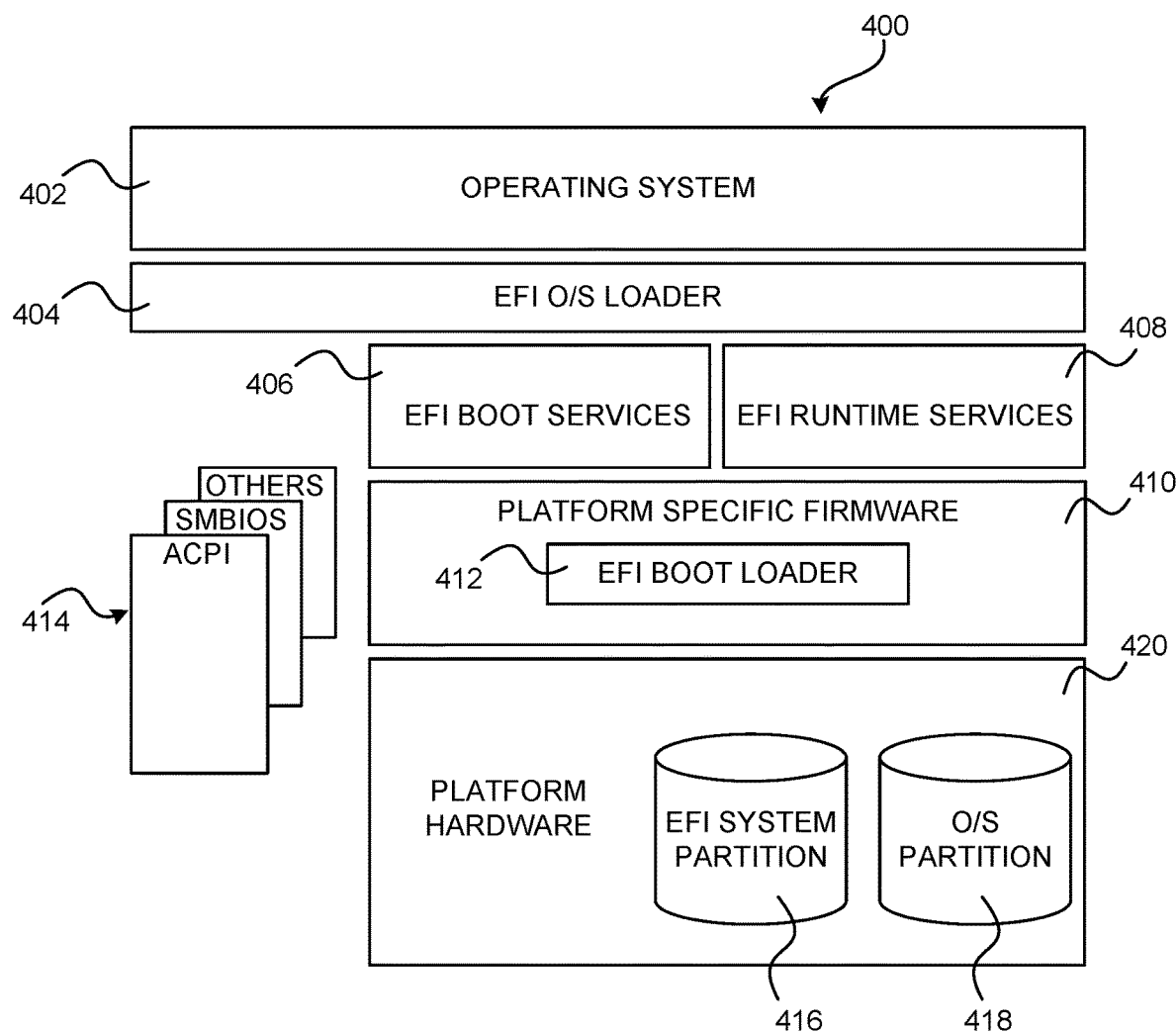
FIG. 4 is a software architecture diagram illustrating a software architecture for a unified extensible firmware interface ("UEFI")-compliant firmware that provides an operating environment for aspects of the technologies presented herein in one embodiment.

Turning now to FIG. 4, a software architecture diagram will be described that illustrates an architecture for a Unified Extensible Firmware Interface ("UEFI") Specification-compliant firmware 400 that can be configured to provide and/or utilize aspects of the technologies disclosed herein. In particular, the firmware architecture shown in FIG. 4 can be utilized to implement the firmware 106 described above. The firmware 106 can also be implemented in other ways in other configurations.

The UEFI Specification describes an interface between an operating system 402 and a UEFI Specification-compliant firmware 400. The UEFI Specification also defines an interface that a firmware 400 can implement, and an interface that an operating system 402 can use while booting. How a firmware implements the interface can be left up to the manufacturer of the firmware. The UEFI Specification also defines a way for an operating system 402 and a firmware 400 to exchange information necessary to support the operating system boot process. The term "UEFI Specification" used herein refers to both the EFI Specification developed by INTEL CORPORATION and the UEFI Specification managed by the UEFI FORUM.

As shown in FIG. 4, the architecture can include platform hardware 420, such as that described below with regard to FIG. 5, and an operating system 402. A boot loader 412 for the operating system 402 can be retrieved from the UEFI system partition 416 using a UEFI operating system loader 404. The UEFI system partition 416 can be an architecturally shareable system partition. As such, the UEFI system partition 416 can define a partition and file system designed to support safe sharing of mass storage between multiple vendors. An OS partition 418 can also be utilized.

Once started, the UEFI OS loader 404 can continue to boot the complete operating system 402. In doing so, the UEFI OS loader 404 can use UEFI boot services 406, an interface to other supported specifications, to survey, comprehend, and initialize the various platform components and the operating system software that manages them. Thus, interfaces 414 from other specifications can also be present on the system. For example, the advanced configuration and power interface ("ACPI") and the System Management BIOS ("SMBIOS") specifications can be supported.

UEFI boot services 406 can provide interfaces for devices and system functionality used during boot time. UEFI runtime services 408 can also be available to the UEFI OS loader 404 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 402 and system firmware 400, the Framework is a group of specifications that together describe a firmware implementation that has been designed to perform the full range of operations that are required to initialize a platform from power on through transfer of control to the operating system 402. The specifications that make up the Framework, which are also available from INTEL CORPORATION, are also expressly incorporated herein by reference.

Figure 5:
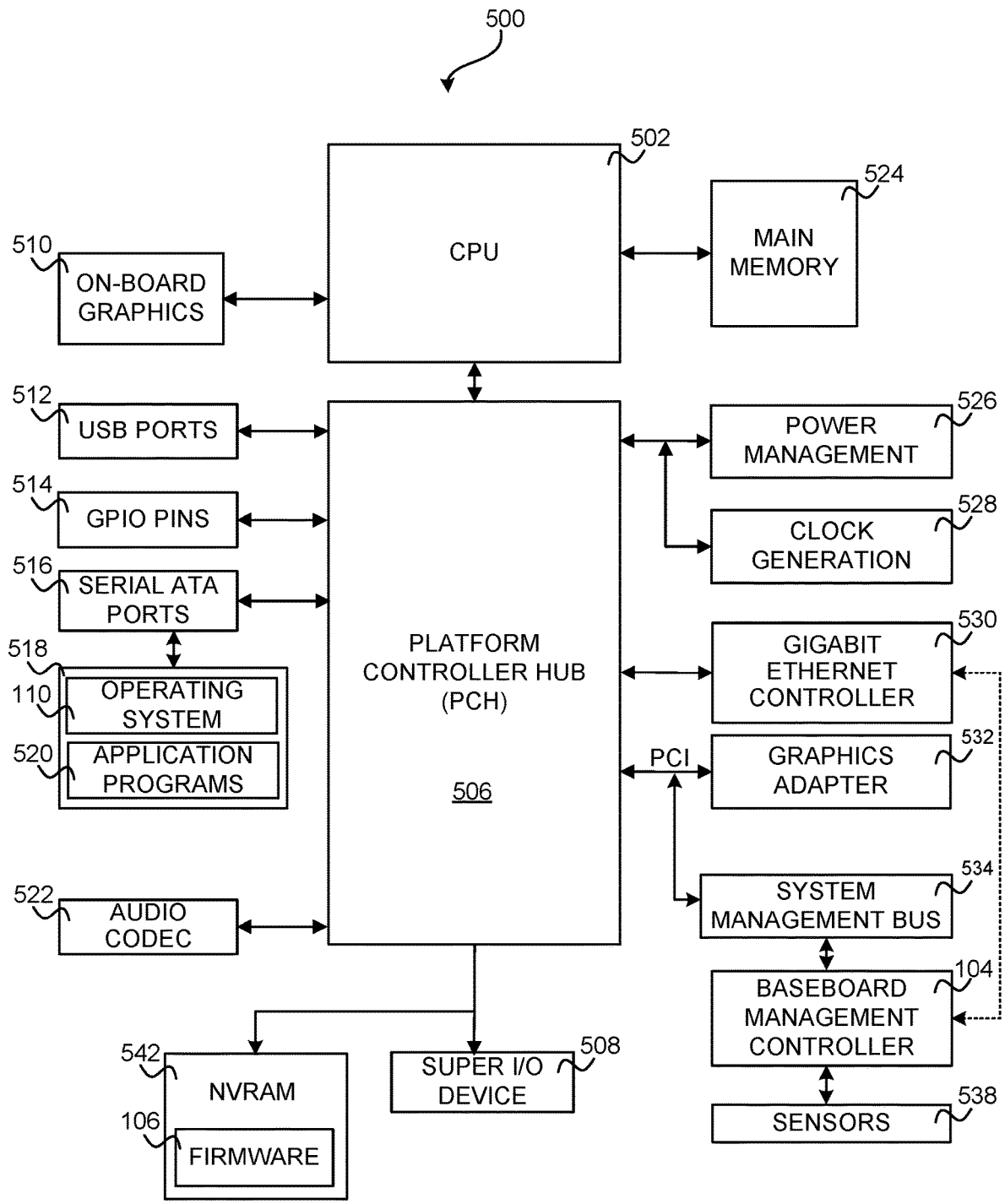
FIG. 5 is a computer architecture diagram that shows an illustrative architecture for a computer that can implement the technologies disclosed herein, according to an embodiment.

Referring now to FIG. 5, a computer architecture diagram that shows an illustrative architecture for a computer that can provide an operating environment for the technologies presented herein will be described. For example, and without limitation, the computer architecture shown in FIG. 5 can be utilized to implement a managed computing system 102, computing systems within the management system 130 such as those implementing the attestation service 132, and/or any of the other computing systems disclosed herein.

FIG. 5 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 5 shows an illustrative computer architecture for a computer 500 that can be utilized to implement the technologies described herein. The computer 500 includes a baseboard, or "motherboard", which is a printed circuit board to which a multitude of components or devices can be connected by way of a system bus or other electrical communication path. In one illustrative configuration, a central processing unit ("CPU") 502 operates in conjunction with a Platform Controller Hub ("PCH") 506. The CPU 502 is a central processor that performs arithmetic and logical operations necessary for the operation of the computer 500. The computer 500 can include a multitude of CPUs 502. Each CPU 502 might include multiple processing cores.

The CPU 502 provides an interface to a random access memory ("RAM") used as the main memory 524 in the computer 500 and, possibly, to an on-board graphics adapter 510. The PCH 506 provides an interface between the CPU 502 and the remainder of the computer 500.

The PCH 506 can also be responsible for controlling many of the input/output functions of the computer 500. In particular, the PCH 506 can provide one or more universal serial bus ("USB") ports 512, an audio codec 522, a Gigabit Ethernet Controller 532, and one or more general purpose input/output ("GPIO") pins 514. The USB ports 512 can include USB 2.0 ports, USB 3.0 ports and USB 3.1 ports among other types of USB ports. The audio codec 522 can include Intel High Definition Audio, Audio Codec '97 ("AC'97") and Dolby TrueHD among others.

The PCH 506 can also include functionality for providing networking functionality through a Gigabit Ethernet Controller 530. The Gigabit Ethernet Controller 530 is capable of connecting the computer 500 to another computer via a network. Connections which can be made by the Gigabit Ethernet Controller 530 can include local area network ("LAN") or wide area network ("WAN") connections. LAN and WAN networking environments are commonplace in offices, enterprise-wide computer networks, intranets, and the Internet.

The PCH 506 can also provide a bus for interfacing peripheral card devices such as a graphics adapter 532. In one configuration, the bus comprises a Peripheral Component Interconnect ("PCI") bus. The PCI bus can be a Peripheral Component Interconnect eXtended ("PCI-X") bus or a Peripheral Component Interconnect Express ("PCIe") bus among others, according to embodiments. Other types of buses are utilized in other embodiments.

The PCH 506 can also provide a system management bus 534 for use in managing the various components of the computer 500. Additional details regarding the operation of the system management bus 534 and its connected components are provided below. Power management circuitry 526 and clock generation circuitry 528 can also be utilized during the operation of the PCH 506.

The PCH 506 is also configured to provide one or more interfaces for connecting mass storage devices to the computer 500. For instance, according to one configuration, the PCH 506 includes a serial advanced technology attachment ("SATA") adapter for providing one or more SATA ports 516. The SATA ports 516 can be connected to one or more mass storage devices storing an OS, such as OS 110 and application programs 520, such as a SATA disk drive 518. As known to those skilled in the art, an OS 110 comprises a set of programs that control operations of a computer and allocation of resources. An application program is software that runs on top of the operating system 110, or other runtime environment, and uses computer resources to perform application specific tasks desired by the user.

According to one configuration, the OS 110 comprises the LINUX operating system. According to another configuration, the OS 110 comprises the WINDOWS operating system from MICROSOFT CORPORATION. According to another configuration, the OS 110 comprises the UNIX operating system or one of its variants. It should be appreciated that other operating systems can also be utilized.

The mass storage devices connected to the PCH 506, and their associated computer-readable storage media, provide non-volatile storage for the computer 500. Although the description of computer-readable storage media contained herein refers to a mass storage device, such as a hard disk or CD-ROM drive, it should be appreciated by those skilled in the art that computer-readable storage media can be any available media that can be accessed by the computer 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals.

Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 500.

A low pin count ("LPC") interface can also be provided by the PCH 506 for connecting a Super I/O device 508. The Super I/O device 508 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 542 for storing firmware 106 that includes program code containing the basic routines that help to start up the computer 500 and to transfer information between elements within the computer 500 as discussed above with regard to FIG. 4.

It should be appreciated that the program modules disclosed herein, including the firmware 106, can include software instructions that, when loaded into the CPU 502 and executed, transform a general-purpose computer 500 into a special-purpose computer 500 customized to facilitate all, or part of, the operations disclosed herein. As detailed throughout this description, the program modules can provide various tools or techniques by which the computer 500 can participate within the overall systems or operating environments using the components, logic flows, and/or data structures discussed herein.

The CPU 502 can be constructed from any number of transistors or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein. The states of either machine can also be transformed by receiving input from one or more user input devices, network interfaces (such as the Gigabit Ethernet Controller 530), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 524 and/or NVRAM 504. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 506 can include a system management bus 534. As discussed above, when utilized to implement a managed computing system 102, the system management bus 534 can include a BMC 104. As discussed above, the BMC 104 is a microcontroller that monitors aspects of the operation of the computer 500. In a more specific configuration, the BMC 104 monitors the inventory and health-related aspects associated with the computer 500, such as, but not limited to, the temperature of one or more components of the computer 500, speed of rotational components (e.g., spindle motor, CPU fan, etc.) within the computer 500, the voltage across or applied to one or more components within the computer 500, and the available and/or used capacity of memory devices within the computer 500. To accomplish these monitoring functions, the BMC 104 is communicatively connected to one or more components by way of the system management bus 534 in some configurations.

In one configuration, these components include sensor devices 538 for measuring various operating and performance-related parameters within the computer 500. The sensor devices 538 can be either hardware or software based components configured or programmed to measure or detect one or more of the various operating and performance-related parameters.

The BMC 104 functions as the master on the system management bus 534 in most circumstances but can also function as either a master or a slave in other circumstances. Each of the various components communicatively connected to the BMC 104 by way of the system management bus 534 is addressed using a slave address. The system management bus 534 is used by the BMC 112 to request and/or receive various operating and performance-related parameters from one or more components, such as the firmware 106, which are also communicatively connected to the system management bus 534.

It should be appreciated that the functionality provided by the computer 500 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 500 might not include all the components shown in FIG. 5, can include other components that are not explicitly shown in FIG. 5, or might utilize an architecture completely different than that shown in FIG. 5.

Based on the foregoing, it should be appreciated that technologies for OOB remote attestation have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
   receiving a security token from a remote attestation service at a computing system;
   storing the security token at a baseboard management controller (BMC) of the computing system;
   collecting, by way of a firmware executing on the computing system, one or more measurements, the one or more measurements comprising data describing a component of the computing system;
   providing the one or more measurements from the firmware to the BMC of the computing system;
   generating a digital signature of the one or more measurements and the security token by way of the BMC; and
   providing the one or more measurements and the digital signature to the remote attestation service, whereby the remote attestation service
   attempts to verify the digital signature, and
   if the digital signature can be verified, compares the one or more measurements to golden measurements for the component of the computing system to attest the component.

2. The computer-implemented method of claim 1, wherein collecting the one or more measurements comprises:
   collecting the one or more measurements by way of a boot process executing in the firmware;
   storing the one or more measurements in a trusted platform module (TPM) of the computing system; and
   executing a data collector in the firmware to retrieve the one or more measurements from the TPM and provide the one or more measurements to the BMC of the computing system.

3. The computer-implemented method of claim 2, wherein the data collector provides the one or more measurements to the BMC by way of a Security Protocol and Data Model (SPDM) interface.

4. The computer-implemented method of claim 3, wherein the remote attestation service periodically updates the security token.

5. The computer-implemented method of claim 4, wherein the remote attestation service attests the component by generating an attestation report that indicates a trust status of the component.

6. The computer-implemented method of claim 5, wherein the one or more measurements and the digital signature are provided to the remote attestation service by way of a REDFISH interface.

7. The computer-implemented method of claim 1, wherein no operating system is installed on the computing system.

8. At least one non-transitory computer-readable storage medium having computer-executable instructions stored thereupon which, when executed by a computing system, cause the computing system to:
   receive a security token from a remote attestation service at the computing system;
   store the security token at a baseboard management controller (BMC) of the computing system;
   collect, by way of a firmware executing on the computing system, one or more measurements, the one or more measurements comprising data describing a component of the computing system;
   provide the one or more measurements from the firmware to the BMC of the computing system;
   generate a digital signature of the one or more measurements and the security token by way of the BMC; and
   provide the one or more measurements and the digital signature to the remote attestation service, whereby the remote attestation service
      attempts to verify the digital signature, and
      if the digital signature is verified, compares the one or more measurements to golden measurements for the component of the computing system to attest the component.

9. The non-transitory computer-readable storage medium of claim 8, wherein collecting the one or more measurements comprises:
   collecting the one or more measurements by way of a boot process executing in the firmware;
   storing the one or more measurements in a trusted platform module (TPM) of the computing system; and
   executing a data collector in the firmware to retrieve the one or more measurements from the TPM and provide the one or more measurements to the BMC of the computing system.

10. The non-transitory computer-readable storage medium of claim 9, wherein the data collector provides the one or more measurements to the BMC by way of a Security Protocol and Data Model (SPDM) interface.

11. The non-transitory computer-readable storage medium of claim 10, wherein the remote attestation service periodically updates the security token.

12. The non-transitory computer-readable storage medium of claim 11, wherein the remote attestation service attests the component by generating an attestation report that indicates a trust status of the component.

13. The non-transitory computer-readable storage medium of claim 12, wherein the one or more measurements and the digital signature are provided to the remote attestation service by way of a REDFISH interface.

14. The non-transitory computer-readable storage medium of claim 8, wherein no operating system is installed on the computing system.

15. A computing system, comprising:
   one or more processors;
   a baseboard management controller (BMC); and
   at least one non-transitory computer-readable storage medium having computer-executable instructions stored thereupon which, when executed by the one or more processors, cause the computing system to:
      receive a security token from a remote attestation service at the computing system;
      store the security token at the BMC;
      collect, by way of a firmware executing on the computing system, one or more measurements, the one or more measurements comprising data describing a component of the computing system;
      provide the one or more measurements from the firmware to the BMC of the computing system;
      generate a digital signature of the one or more measurements and the security token by way of the BMC; and
      provide the one or more measurements and the digital signature to the remote attestation service, whereby the remote attestation service
         attempt to verify the digital signature; and
         if the digital signature is verified, compare the one or more measurements to golden measurements for the component of the computing system to attest the component.

16. The computing system of claim 15, wherein collecting the one or more measurements comprises:
   collecting the one or more measurements by way of a boot process executing in the firmware;
   storing the one or more measurements in a trusted platform module (TPM) of the computing system; and
   executing a data collector in the firmware to retrieve the one or more measurements from the TPM and provide the one or more measurements to the BMC of the computing system.

17. The computing system of claim 16, wherein the data collector provides the one or more measurements to the BMC by way of a Security Protocol and Data Model (SPDM) interface.

18. The computing system of claim 17, wherein the remote attestation service periodically updates the security token.

19. The computing system of claim 18, wherein the remote attestation service attests the component by generating an attestation report that indicates a trust status of the component.

20. The computing system of claim 19, wherein the one or more measurements and the digital signature are provided to the remote attestation service by way of a REDFISH interface.

* * * * *